Aug. 15, 1950     C. W. TYDEMAN     2,519,087
PORTABLE TURNING LATHE
Filed Feb. 10, 1947     3 Sheets-Sheet 1

INVENTOR.
C. W. TYDEMAN
BY
Thomas Ostberg
ATTORNEY.

Aug. 15, 1950  C. W. TYDEMAN  2,519,087
PORTABLE TURNING LATHE
Filed Feb. 10, 1947  3 Sheets-Sheet 2

INVENTOR.
C. W. TYDEMAN
BY
Thomas Aastberg
ATTORNEY.

Aug. 15, 1950 — C. W. TYDEMAN — 2,519,087
PORTABLE TURNING LATHE
Filed Feb. 10, 1947 — 3 Sheets-Sheet 3
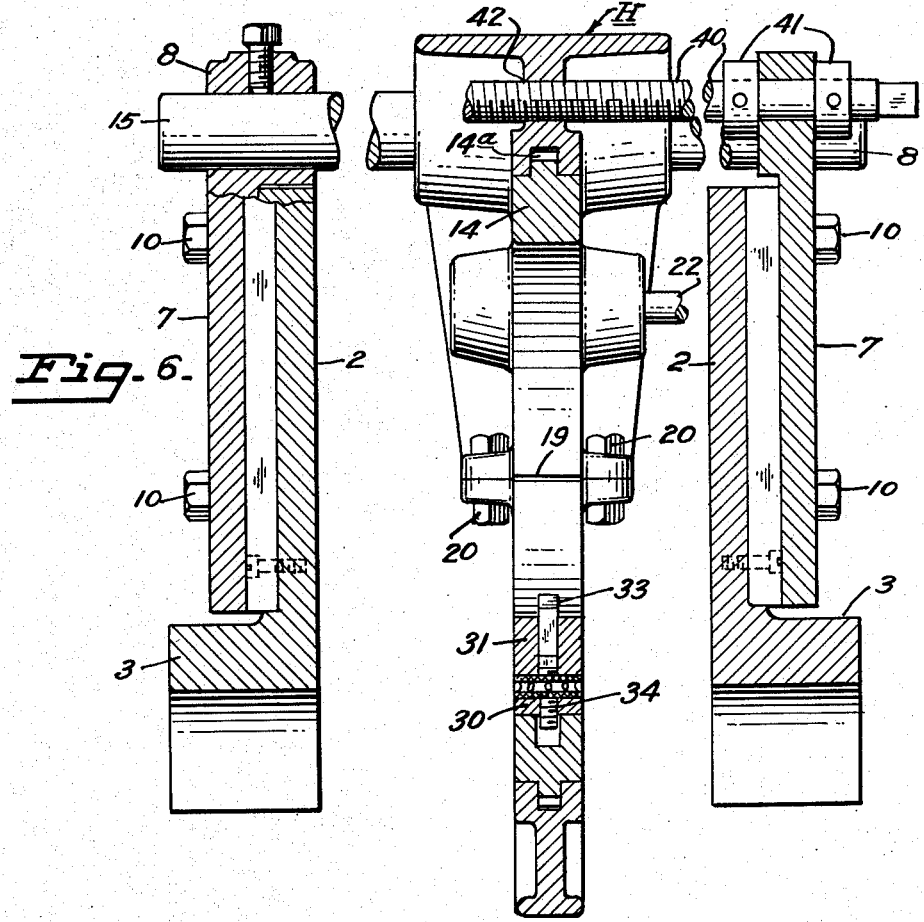
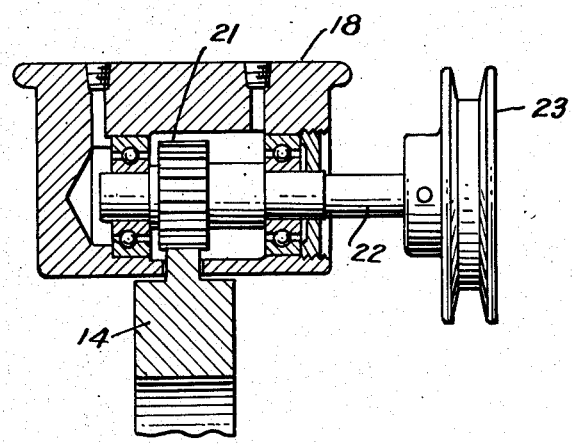
INVENTOR.
C. W. TYDEMAN
BY Thomas Aastberg
ATTORNEY Patented Aug. 15, 1950

2,519,087

UNITED STATES PATENT OFFICE 2,519,087

PORTABLE TURNING LATHE

Clarence W. Tydeman, San Bruno, Calif., assignor to General Engineering and Drydock Company, San Francisco, Calif., a corporation of Delaware Application February 10, 1947, Serial No. 727,503

2 Claims. (Cl. 82—4)

This invention relates to a portable turning lathe especially designed to be placed inside the crankcase of a Diesel or like engine where it may be bolted to the main bearings of a crankshaft and in a position to turn the crankpins.

In the operation of a large Diesel engine, whether marine or stationary, no matter how efficient the engine room crew may be or the amount of care taken, accidents do happen. For instance, foreign matter may enter one of the lubricating ducts and a connecting rod may seize on a crank pin and score it, or a connecting rod may break and form chatter marks on the crankpin, and so on. In such cases it is usually necessary to dismantle the engine in order to remove the crankshaft for repair. This obviously takes time, and on board most ships becomes a major repair job.

The object of the present invention is to provide a portable turning lathe which is capable of turning down the crankpins on a crankshaft without removing the shaft from the engine; to provide a lathe of the character described which may be placed inside the crank case of an engine and bolted to the main bearings of the crankshaft; to provide a turning lathe in which the cutting tool rotates around the crank pin to be turned; and further, to provide a lathe which may be quickly set up and taken down as occasion demands and which may be operated by an ordinary mechanic.

The invention is shown by way of illustration in the accompanying drawings, in which:

Fig. 6 is a longitudinal vertical section of the turning lathe; and

Fig. 7 is an enlarged cross section taken on line VII—VII of Fig. 4.

Figure 1:
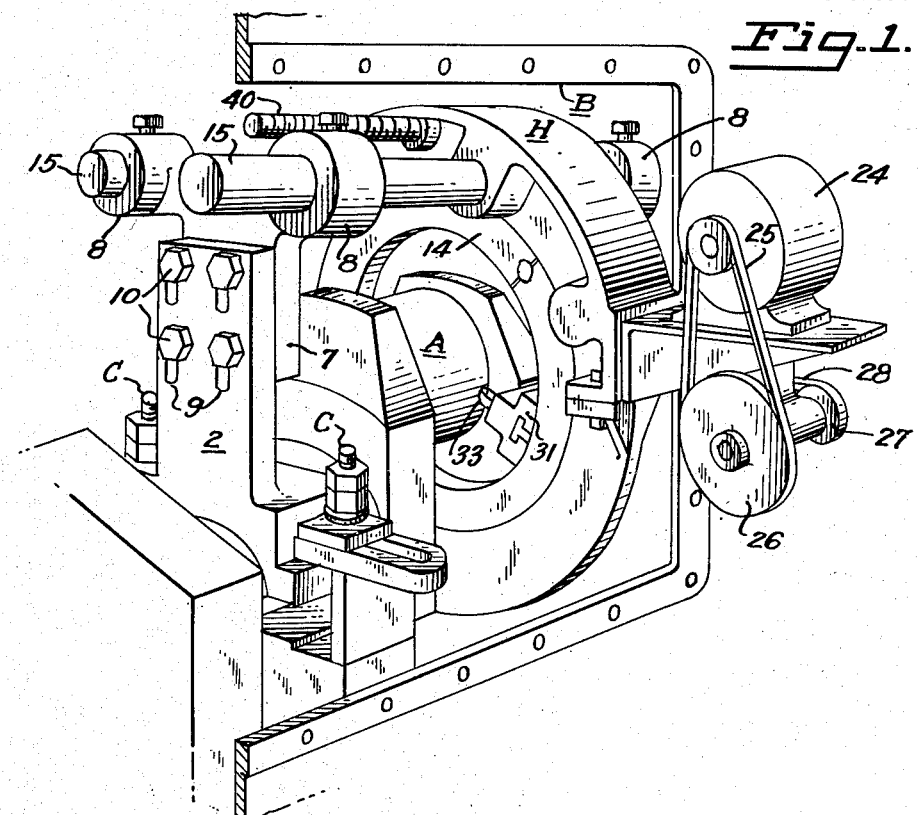
Fig. 1 is a perspective view of the lathe placed inside the crankcase of an engine and in a position to turn one of the crankpins on said shaft.
Figure 4:
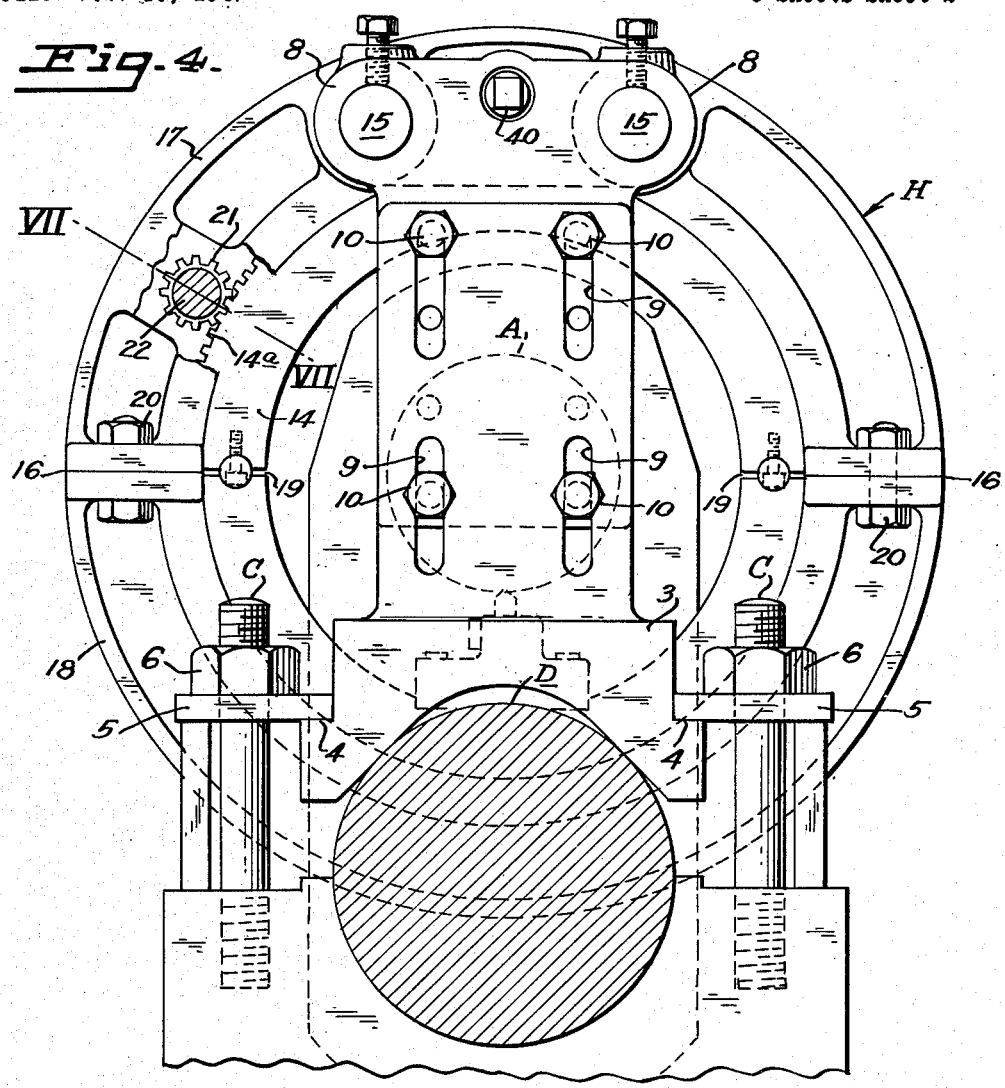
Fig. 4 is a side elevation partially in section showing the turning lathe bolted to the main bearings of a crankshaft and in position to turn a crankpin, said view showing the opposite end of the lathe shown in Fig. 1.

Referring to the drawings in detail, and particularly Figs. 1 and 4, let it be assumed that the crankpin indicated at A has been scored or otherwise damaged to the extent that re-turning of the crankpin is necessary. In that case the cover will have been removed and so will the connecting rod, thus leaving an unobstructed opening B through which the lathe may be inserted. The lathe must be inserted piece by piece, and before the first pieces, to wit the standards, are inserted, the main bearing caps on each side of the crank to be turned are removed. Each main bearing as shown is provided with two stud bolts C—C which hold the bearing caps in place, and these bolts are used to hold and secure the lathe when placed inside the crankcase. The first part of the lathe to be inserted is a pair of uprights or standards generally indicated at 2—2. These are placed on the crankshaft between the bolts C. Each standard has a foot or base portion 3 with a V-shaped surface which rests in the manner of a V-block directly on the rounded surface of the crankshaft as indicated at D (see Fig. 4). A step 4 is formed in each end of the foot 3 and these steps are engaged by lugs 5 which in turn are held and tightened by nuts 6 secured on the respective stud bolts C. In this manner each standard may be rigidly secured and will be positively aligned with relation to the longitudinal axis of the crankshaft due to the employment of the V-block surfaces.

Each standard carries a plate 7 which is provided with a pair of bearing lugs 8—8. These plates have pairs of vertically extending slots 9—9 formed therein through which extend bolts 10—10. The plates 7—7 with their bearing lugs 8—8 are accordingly vertically adjustable with relation to the crankshaft or the crankpin to be turned. This is obviously essential as the throw of a crankpin varies with different makes and sizes of engines.

The rotating member of the turning lathe, that is the member which carries the cutting tool, comprises a ring gear 14 which is journaled for rotation within a ring shaped frame generally indicated at H. This frame is supported on a pair of rods 15—15 secured in the bearing lugs 8 and the frame is slidable longitudinally of the rods and the crankpin to be turned as will hereinafter be more fully described.

Inasmuch as the ring 14 and the frame H in which it is journaled must surround the crankpin A when it is to be turned, it is necessary that the frame H be split transversely on the line 16—16 to form an upper half section 17 and a lower half section 18 and that the ring 14 be similarly split on the lines 19—19 (see Fig. 4). By so splitting the frame H and the ring 14, the upper half 17 of the frame which is carried by the rods 15 may be placed in position above the crankpin, then the upper half of the ring gear 14, finally the lower half 18 of the frame, and the lower half of the ring gear 14 is applied and the two frame parts are secured together by the bolts 20—20. Then by adjusting the standards first on the B blocks and then for height, it becomes possible to position a turning tool so that it will be positively concentric to the pin A to be turned.

It will be noted that ring gear 14 (see Figs. 4, 6 and 7) has spur gear teeth 14a formed thereon and that they mesh with a gear pinion 21 secured on a shaft 22 which is journaled in the upper frame 18. This shaft carries a pulley 23 and this is driven at a suitably reduced speed from an electric motor or the like indicated at 24. That is, the motor is supported on the upper section of the frame H as clearly shown in Fig. 1. Through a belt 25 the motor drives a pulley 26 which in turn drives a pulley 27 and this pulley through a belt 28 drives pulley 23 and shaft 22 at a reduced speed thereby transmitting continuous rotation to the ring gear 14 and a cutting tool carried thereby.

Figure 5:
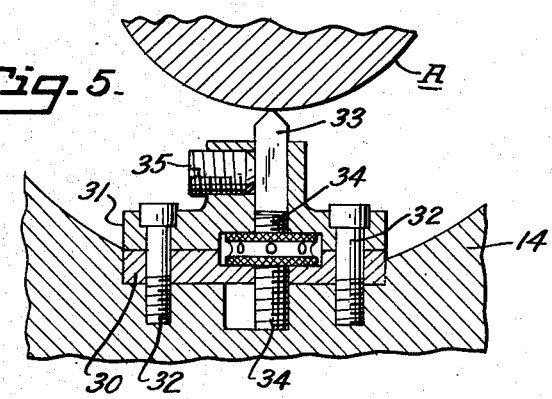
Fig. 5 is an enlarged cross section showing a cutting tool in its holder, said section also showing a portion of the ring on which the tool holder is mounted.

In order that the crankpin may be turned from end to end the type of cutting tool shown in Fig. 5 is employed. The structure shown comprises a pair of blocks 30 and 31 secured to ring gear 14 by screws 32—32. A cutting tool is indicated at 33 and it is mounted in the block 31 and is radially adjustable by means of a screw shown at 34. After adjustment, the cutting tool is secured in the usual way by a set screw 35.

Figure 3:
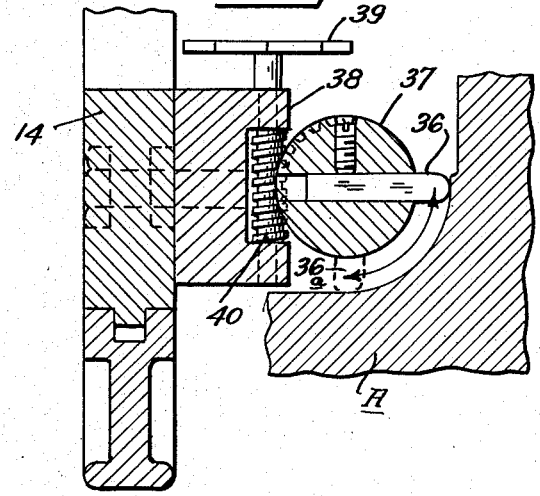
Fig. 3 is a cross section taken on line III—III of Fig. 2, said view also showing a portion of a fillet to be turned.
Figure 2:
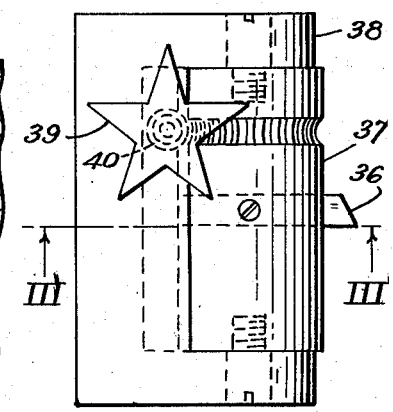
Fig. 2 is a side elevation of a tool holder intended for cutting fillets at each end of the crankpin.

If the crankpin has a fillet at each end, a cutting tool such as shown at 36 is used. This tool is mounted in a holder 37 pivoted in a block 38 which is secured to the side face of the ring gear 14. Block 38 carries a star gear 39 which actuates a worm gear pinion 40 which in turn actuates the tool holder, thus at each rotation of the ring gear 14, the star gear is rotated a partial revolution by engagement with an actuator not shown. As a result, the cutting tool 36 gradually swings from the full line position shown in Fig. 3 to the dotted line position indicated at 36a, thereby gradually turning the fillet at one end or the other of the crankpin. When cutter 33 is in operation, the frame 8 carrying the ring gear 14 must be moved gradually longitudinally on the rods 15 in order that the entire length of the crankpin may be turned. To accomplish this a feed rod 40 is employed (see Figs. 1 and 6). This rod is square at one end to receive a hand crank whereby it may be rotated by the operator of the lathe. The rod is freely rotatable in one of the standards as shown but it is secured against endwise movement by a pair of collars 41—41 and as the rod has threaded engagement with the frame H at the point 42 (see Fig. 6), frame H together with the ring 14 mounted therein and the cutting tool carried thereby will move longitudinally with relation to the crankpin when the feed rod is rotated.

The essential parts of the lathe are the frame H consisting of its upper part 17 and its lower part 18, the ring gear 14 which it supports, the tool holder carried by the ring gear and the standards at opposite ends to support the frame. These parts are quickly taken apart and just as readily assembled, hence when the connecting rod has been removed from the crankpin and the crankcase is open, it is obvious that setting up of the lathe or removal thereof is a comparatively simple job, and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

1. In a machine of the character described, comprising a frame adapted to encircle a work piece and a rotatable member rotatable in said frame and adapted to carry a tool and to rotate the same about said work piece, the improvement which comprises a pair of spaced, upright standards and each comprising an upper portion and a lower portion which are adjustable to vary the height of the standard and provided with means for clamping in adjusted position, each said lower portion being formed with a V notch adapted to seat on a crankpin or the like and being provided with clamping means adapted to clamp to a half bearing, and each said upper portion being formed with spaced holes, rods extending between said standards and received within said holes and slidably supporting said frame, and means for clamping said rods to said standards in adjusted position.

2. A machine of the character described, comprising a pair of spaced, upright standards, each being adjustable in height and each having a V notch at its base for seating on a crankpin or the like, having spaced holes formed in its upper portion and having clamping means for clamping to a half bearing, rods extending between said standards and slidably received within said holes, means for clamping said rods in said holes in adjusted position, a frame adapted to encircle a work piece and slidably supported by said rods, a rotatable member rotatable in said frame and adapted to support a tool and rotate the same about said work piece, means for rotating said rotatable member and means for sliding said frame along said rods.

CLARENCE W. TYDEMAN.

REFERENCES CITED

The following references are of record in the file of this patent:

UNITED STATES PATENTS

| Number | Name | Date |
|---|---|---|
| 322,320 | Reed | July 14, 1885 |
| 688,681 | Peterson | Dec. 10, 1901 |
| 899,536 | Jacobs | Sept. 29, 1908 |
| 1,888,792 | Cottrell | Nov. 22, 1932 |
| 2,127,584 | Christensen | Aug. 23, 1938 |